UNITED STATES PATENT OFFICE.

DAVID WATSON, OF PETERSBURG, VIRGINIA.

IMPROVEMENT IN HARVESTERS.

Specification forming part of Letters Patent No. 13,285, dated July 17, 1855.

*To all whom it may concern:*

Be it known that I, DAVID WATSON, of Petersburg, in Dinwiddie county, and State of Virginia, have invented a new and useful Improvement in Harvesters; and I do hereby declare that the following is a full, clear, and exact description thereof, reference being had to the accompanying drawings, and to letters of reference marked thereon, forming part of this specification, and in which—

Figure 1:
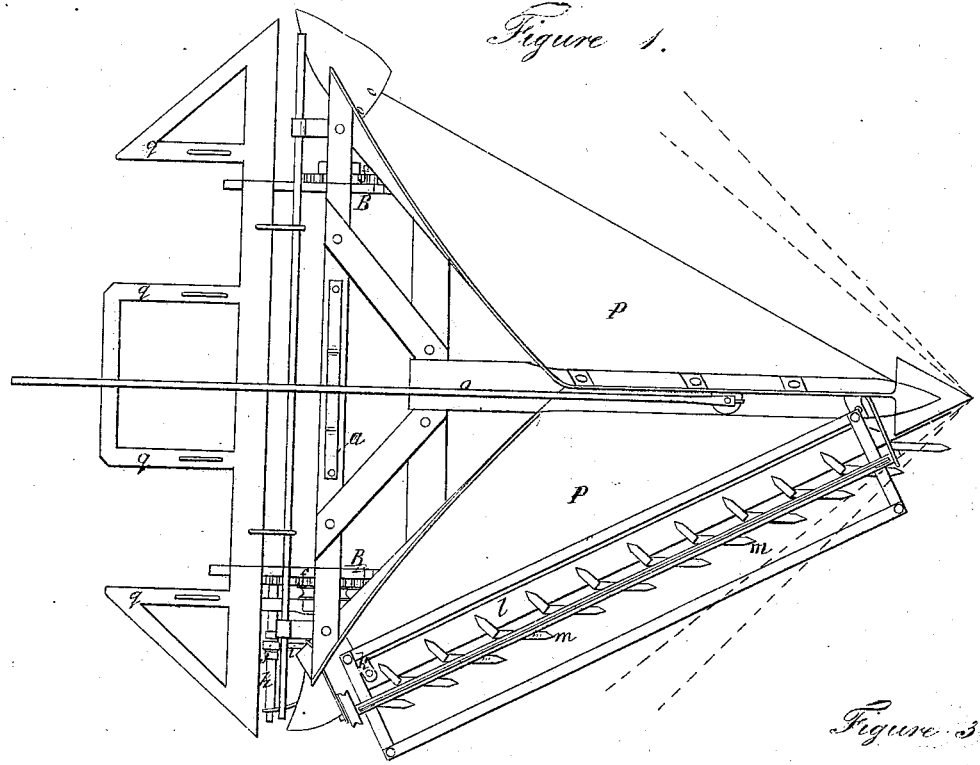
Figure 3:
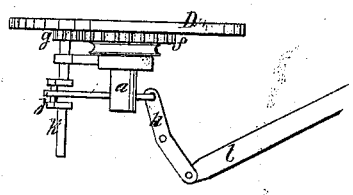
Figure 2:
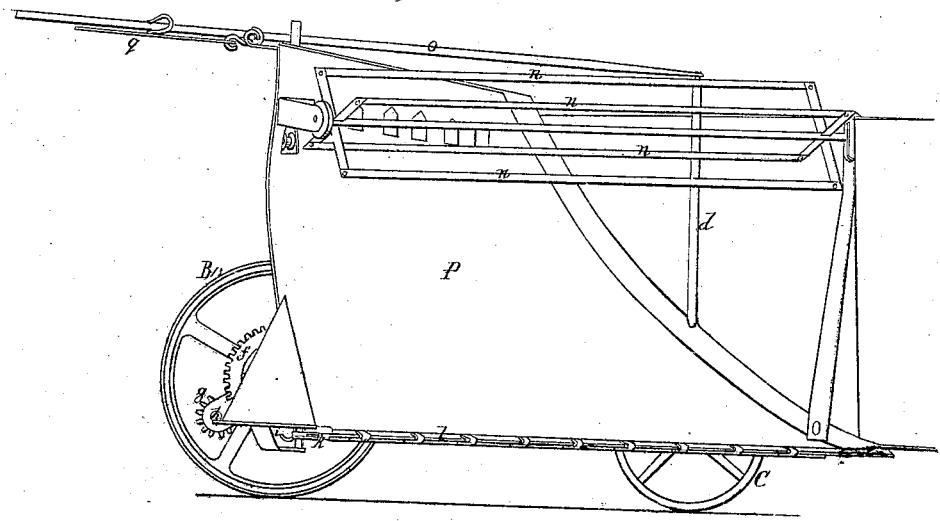

Figure 1 is a plan of the reaper, the cutter-bar fingers and reel being shown on one side only. Fig. 2 is a side elevation. Fig. 3 is a plan of the driving-wheel gearing and lever for operating the reciprocating cutter.

The same letters of reference occurring in the several figures indicate corresponding parts.

The nature of my invention consists in so arranging the reciprocating cutters that the standing grain is gathered by the fingers into acute-angled spaces and severed by the receding motion of the cutters or while they are moving toward the acute angle, whereby the straw is held more firmly to the cut than when the cutter is operated at right angles with the travel of the machine, and the cutters being arranged diagonally to the line of motion makes them at least double the length that they would be for clearing the same breadth of land if at right angles thereto, so that each finger gathers but half the quantity of straw, which is consequently severed with greater ease and certainty.

To enable others to clearly understand my invention, I will proceed to describe it by referring to the drawings.

The general appearance of my reaper somewhat resembles a plow with a mold-board on each side, having an axle, $a$, extending from side to side at its rear end, on which are hung two driving-wheels, B. I also use a single or pilot wheel, $c$, near the forward point of the machine, hung in a fork, with a vertical shaft, $d$, to the upper end of which is attached a horizontal lever, $e$, for the purpose of steering the machine. To the side of the driving-wheel B is firmly attached a spur-wheel, $f$, which communicates motion through the pinion $g$ to the crank-shaft $h$.

$i$ is a pitman, which connects the crank $j$ with one end of the lever $k$, which has its fulcrum at or near its center. Its other end is attached to the end of the cutter $l$ and causes it to reciprocate rapidly. This cutter is what is commonly termed "sickle-edged," arranged to cut in its backward motion. The fingers $m$ are about the same distance apart at the points where they intersect the edge of the cutter that they are usually placed in reapers whose cutters are at right angles to the motion of the machine, and, projecting parallel to the longitudinal center of the machine, each finger gathers a much smaller quantity of straw, which collects in an acute angle formed by the finger and the cutter. The receding motion of the cutter severs it with ease and certainty, there being no possibility of its glancing from the knife, as must be the case with other machines above alluded to. The heads of the standing crop are borne toward the reaper by the reel $n$, which is caused to revolve by a cord and pulleys or other suitable device from the axle $a$, and fall on the curved diagonal sides P of the machine when severed, along which they slide to the rear end in the same manner as the soil on the mold-board of a plow, and are delivered in rows on the ground, or may be raked off in bundles, as desired.

At the rear end of the machine are yokes $q$, attached in any convenient manner and position, to which the horses are geared to propel the machine before them. The driver, being mounted on one of the horses, steers the machine by the pilot-wheel $c$ through the lever or bar $o$.

This machine may be constructed with a single diagonal cutter on one side of the triangle, or on two sides, or a series of them extending in angular form to any desired width.

Having thus described my invention, I wish it to be understood that I do not claim the diagonal arrangement of a series of rotary cutters or the diagonal cut of a certain portion of one or more rotary cutters; but

What I claim therein as new, and desire to secure by Letters Patent, is—

The arrangement of a reciprocating cutter or cutters diagonally to the line of motion of the machine, substantially as specified.

In testimony whereof I have hereunto subscribed my name this 31st day of May, 1855.

DAVID WATSON.

Witnesses:
JOHN L. SMITH,
E. G. HANDY.